United States Patent
Akoum et al.

(10) Patent No.: US 11,575,425 B2
(45) Date of Patent: *Feb. 7, 2023

(54) FACILITATING SPARSITY ADAPTIVE FEEDBACK IN THE DELAY DOPPLER DOMAIN IN ADVANCED NETWORKS

(71) Applicant: AT&T Intellectual Property I, L.P., Atlanta, GA (US)

(72) Inventors: Salam Akoum, Austin, TX (US); Xiaoyi Wang, Austin, TX (US); Ralf Bendlin, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,878

(22) Filed: Oct. 19, 2021

(65) Prior Publication Data

US 2022/0038155 A1 Feb. 3, 2022

Related U.S. Application Data

(63) Continuation of application No. 17/104,834, filed on Nov. 25, 2020, now Pat. No. 11,184,074, which is a
(Continued)

(51) Int. Cl.
*H04B 7/06* (2006.01)
*H04B 17/382* (2015.01)
*H04L 25/02* (2006.01)

(52) U.S. Cl.
CPC ......... *H04B 7/0626* (2013.01); *H04B 7/0663* (2013.01); *H04B 17/382* (2015.01); *H04L 25/021* (2013.01)

(58) Field of Classification Search
CPC ................ H04B 7/0626; H04B 7/0663; H04B 17/382; H04B 7/0615; H04B 7/0619;
(Continued)

(56) References Cited

U.S. PATENT DOCUMENTS 4,644,562 A * 2/1987 Kavehrad .............. H04B 7/002
375/348
6,018,317 A * 1/2000 Dogan ................. H04B 7/0857
342/373
(Continued)

FOREIGN PATENT DOCUMENTS

WO 2017/044501 A1 3/2017
WO 2017/100666 A1 6/2017

OTHER PUBLICATIONS

International Preliminary Report on Patentability received for PCT Application Serial No. PCT/US2020/030805 dated Jan. 6, 2022, 8 pages.
Communication pursuant to Rules 161(1) and 162 EPC received for E.P. Patent Application Serial No. 20727489.5 dated Feb. 3, 2022, 3 pages.
Non-Final Office Action received for U.S. Appl. No. 16/455,123 dated Sep. 3, 2020, 18 pages.
(Continued)

*Primary Examiner* — James M Perez
(74) *Attorney, Agent, or Firm* — Amin, Turocy & Watson, LLP

(57) ABSTRACT

Facilitating sparsity adaptive feedback in the delay doppler domain in advanced networks (e.g., 4G, 5G, 6G, and beyond) is provided herein. Operations of a method can comprise determining, by a first device comprising a processor, a channel covariance matrix in a time-frequency domain based on a channel estimation associated with reference signals received from a second device. The method also can comprise decomposing, by the first device, the channel covariance matrix into a group of component matrices. Further, the method can comprise transforming, by the first device, respective matrices of the group of component matrices into respective covariance matrices in a delay doppler domain. The method also can comprise determining,
(Continued)

by the first device, channel state information feedback in the delay doppler domain.

20 Claims, 11 Drawing Sheets

Related U.S. Application Data continuation of application No. 16/419,432, filed on May 22, 2019, now Pat. No. 10,886,991.

(58) Field of Classification Search
CPC .... H04B 7/0621; H04B 7/0658; H04B 17/30; H04L 25/021; H04L 25/0202
See application file for complete search history.

(56) References Cited

U.S. PATENT DOCUMENTS

| | | | | |
|---|---|---|---|---|
| 6,654,429 B1* | 11/2003 | Li | H04L 27/2647 | 375/349 |
| 6,826,240 B1* | 11/2004 | Thomas | H04L 25/022 | 375/340 |
| 7,292,651 B2* | 11/2007 | Li | H04L 27/2647 | 375/349 |
| 7,551,547 B2* | 6/2009 | Ghosh | H04L 25/0216 | 370/208 |
| 7,986,614 B2* | 7/2011 | Ghosh | H04L 25/022 | 370/335 |
| 8,064,507 B1* | 11/2011 | Cheng | H04B 7/01 | 375/340 |
| 8,649,254 B2* | 2/2014 | Ghosh | H04L 25/022 | 370/208 |
| 8,675,769 B1* | 3/2014 | Eliaz | H04L 1/0041 | 375/135 |
| 9,197,283 B1* | 11/2015 | Nguyen | H03M 1/128 | |
| 9,686,702 B2* | 6/2017 | Beyme | H04B 17/0087 | |
| 9,991,976 B2* | 6/2018 | Hu | H04L 25/03968 | |
| 10,020,930 B2* | 7/2018 | Pelissier | H04L 7/0016 | |
| 10,171,214 B2* | 1/2019 | Wang | H04L 5/0048 | |
| 10,257,105 B2* | 4/2019 | Majmundar | H04L 45/42 | |
| 10,355,887 B2* | 7/2019 | Hadani | H04L 25/08 | |
| 10,404,337 B1* | 9/2019 | Tan | H04B 17/104 | |
| 10,530,504 B2* | 1/2020 | Fechtel | H04B 17/336 | |
| 10,547,397 B2* | 1/2020 | Chopra | H04B 17/391 | |
| 10,651,912 B2* | 5/2020 | Wang | H04L 27/2671 | |
| 10,666,479 B2* | 5/2020 | Hadani | H04B 7/01 | |
| 10,673,659 B2* | 6/2020 | Hadani | H04L 25/03178 | |
| 10,708,091 B2* | 7/2020 | Fechtel | H04L 25/021 | |
| 10,826,591 B1* | 11/2020 | Akoum | H04B 7/0621 | |
| 10,886,985 B2* | 1/2021 | Ramireddy | H04B 7/0673 | |
| 10,886,991 B2* | 1/2021 | Akoum | H04B 7/01 | |
| 10,951,454 B2* | 3/2021 | Delfeld | H04L 27/34 | |
| 10,979,151 B2* | 4/2021 | Bendlin | H04B 17/318 | |
| 11,038,733 B2* | 6/2021 | Hadani | H04L 27/2697 | |
| 11,050,530 B2* | 6/2021 | Wang | H04L 5/0007 | |
| 11,070,329 B2* | 7/2021 | Hadani | H04L 5/0007 | |
| 11,082,352 B2* | 8/2021 | Majmundar | H04L 45/64 | |
| 11,184,074 B2* | 11/2021 | Akoum | H04L 25/0222 | |
| 11,201,680 B2* | 12/2021 | Bendlin | H04B 17/318 | |
| 11,387,882 B2* | 7/2022 | Wang | H04L 25/03012 | |
| 2005/0002461 A1* | 1/2005 | Giannakis | H04L 25/0228 | 375/259 |
| 2006/0176941 A1* | 8/2006 | Nieto | H04L 25/03038 | 375/152 |
| 2006/0269016 A1* | 11/2006 | Long | H04L 5/0048 | 375/346 |
| 2007/0230335 A1* | 10/2007 | Sang | H04L 47/15 | 370/252 |
| 2008/0304416 A1* | 12/2008 | Fodor | H04L 47/11 | 370/237 |
| 2009/0003134 A1* | 1/2009 | Nuttall | G01S 15/101 | 367/87 |
| 2009/0129493 A1* | 5/2009 | Zhang | H04L 1/005 | 375/260 |
| 2009/0274252 A1* | 11/2009 | Ghosh | H04L 25/0216 | 370/208 |
| 2010/0111231 A1* | 5/2010 | Koorapaty | H04L 5/0048 | 375/340 |
| 2010/0271259 A1* | 10/2010 | Stafford | G01S 19/28 | 342/357.21 |
| 2011/0150052 A1* | 6/2011 | Erell | H04B 7/0641 | 375/267 |
| 2011/0243284 A1* | 10/2011 | Ghosh | H04L 27/2647 | 375/346 |
| 2011/0286507 A1* | 11/2011 | Yu | H04L 25/0234 | 375/224 |
| 2012/0069887 A1* | 3/2012 | Park | H04B 7/0626 | 375/224 |
| 2012/0082190 A1* | 4/2012 | Zhu | H04B 7/063 | 375/267 |
| 2012/0082274 A1* | 4/2012 | Bury | H04L 25/0202 | 375/346 |
| 2012/0114072 A1* | 5/2012 | Liu | H04L 5/0044 | 375/295 |
| 2013/0051450 A1* | 2/2013 | Ghosh | H04L 25/022 | 375/232 |
| 2013/0114654 A1* | 5/2013 | Gomadam | H04B 7/0634 | 375/219 |
| 2013/0163537 A1* | 6/2013 | Anderson | H04L 1/1671 | 370/329 |
| 2013/0201912 A1* | 8/2013 | Sheng | H04B 7/0663 | 370/328 |
| 2013/0329772 A1* | 12/2013 | Wernersson | H04B 7/0626 | 375/219 |
| 2014/0161154 A1* | 6/2014 | Hadani | H04L 27/2655 | 375/138 |
| 2014/0169406 A1* | 6/2014 | Hadani | H04B 1/692 | 375/131 |
| 2014/0169437 A1* | 6/2014 | Hadani | H04L 27/2655 | 375/232 |
| 2014/0177745 A1* | 6/2014 | Krishnamurthy | H04B 7/063 | 375/267 |
| 2014/0301492 A1* | 10/2014 | Xin | H04B 7/0456 | 375/267 |
| 2015/0043439 A1* | 2/2015 | Sajadieh | H04W 16/26 | 370/329 |
| 2015/0078472 A1* | 3/2015 | Vook | H04B 7/0617 | 375/267 |
| 2015/0117519 A1* | 4/2015 | Kim | H04N 19/105 | 375/240.02 |
| 2016/0119069 A1* | 4/2016 | Mamidwar | H04L 12/4633 | 370/503 |
| 2016/0119096 A1* | 4/2016 | Sun | H04W 72/042 | 370/329 |
| 2016/0119097 A1* | 4/2016 | Nam | H04L 5/0048 | 370/329 |
| 2016/0156394 A1* | 6/2016 | Kim | H04B 7/0421 | 375/267 |
| 2017/0012749 A1* | 1/2017 | Rakib | H04L 27/2639 | |
| 2017/0012810 A1* | 1/2017 | Rakib | H04L 5/0016 | |
| 2017/0013486 A1* | 1/2017 | Beyme | H04B 17/0085 | |
| 2017/0033899 A1* | 2/2017 | Rakib | H04L 27/2655 | |
| 2017/0041061 A1* | 2/2017 | Lee | H04B 7/0413 | |
| 2017/0048029 A1* | 2/2017 | Lee | H04L 5/0005 | |
| 2017/0048810 A1* | 2/2017 | Sahlin | H04L 27/26 | |
| 2017/0064676 A1* | 3/2017 | Lee | H04L 5/001 | |
| 2017/0078054 A1* | 3/2017 | Hadani | H04L 5/003 | |
| 2017/0093474 A1* | 3/2017 | Lee | H04B 7/0632 | |
| 2017/0099122 A1* | 4/2017 | Hadani | H04L 5/0048 | |
| 2017/0099607 A1* | 4/2017 | Hadani | H04W 24/02 | |
| 2017/0149594 A1* | 5/2017 | Rakib | H04L 5/0007 | |
| 2017/0149595 A1* | 5/2017 | Rakib | H04L 5/001 | |
| 2017/0288710 A1* | 10/2017 | Delfeld | H04L 25/03343 | |
| 2017/0338925 A1* | 11/2017 | Wei | H04W 52/0229 | |
| 2018/0109284 A1* | 4/2018 | Hadani | H04L 27/26416 | |
| 2018/0198497 A1* | 7/2018 | Wei | H04B 7/063 | |
| 2018/0205481 A1* | 7/2018 | Shlomo | H04J 11/00 | |
| 2018/0227159 A1* | 8/2018 | Rakib | H04L 27/26 | |
| 2018/0262306 A1* | 9/2018 | Hadani | H04L 5/0007 | |

(56) References Cited

U.S. PATENT DOCUMENTS

| | | | |
|---|---|---|---|
| 2018/0302176 A1* | 10/2018 | Jeon | H04L 5/0035 |
| 2018/0309598 A1* | 10/2018 | Pena Campos | H04L 25/0224 |
| 2018/0323887 A1* | 11/2018 | Azarian Yazdi | H04L 5/0073 |
| 2019/0013849 A1* | 1/2019 | Kobayashi | H04B 17/102 |
| 2019/0013983 A1* | 1/2019 | Gao | H04B 7/0413 |
| 2019/0036741 A1* | 1/2019 | Hadani | H04L 25/03178 |
| 2019/0044682 A1* | 2/2019 | Hebron | H04L 5/0007 |
| 2019/0068304 A1* | 2/2019 | Fechtel | H04L 25/0224 |
| 2019/0081836 A1* | 3/2019 | Hadani | H04L 27/2647 |
| 2019/0089441 A1* | 3/2019 | Sivahumaran | H04B 7/0478 |
| 2019/0199456 A1* | 6/2019 | Chopra | H04B 17/309 |
| 2019/0207661 A1* | 7/2019 | Fröberg | H04B 17/373 |
| 2019/0230673 A1* | 7/2019 | Ren | H04W 72/085 |
| 2019/0238189 A1* | 8/2019 | Delfeld | H04L 27/2628 |
| 2019/0245602 A1* | 8/2019 | Wang | H04L 25/0224 |
| 2019/0268112 A1* | 8/2019 | Parra Michel | H04B 17/3911 |
| 2019/0312623 A1* | 10/2019 | Park | H04B 7/0617 |
| 2019/0326959 A1* | 10/2019 | Davydov | H04B 7/0469 |
| 2019/0342126 A1* | 11/2019 | Hadani | H04L 25/03286 |
| 2019/0342136 A1* | 11/2019 | Hadani | H04L 27/2639 |
| 2019/0379422 A1* | 12/2019 | Hadani | H04L 5/0048 |
| 2020/0028617 A1* | 1/2020 | Landis | H04L 1/0003 |
| 2020/0045569 A1* | 2/2020 | Seo | H04L 5/0053 |
| 2020/0052931 A1* | 2/2020 | Fechtel | H04L 25/0228 |
| 2020/0099434 A1* | 3/2020 | Wang | H04B 7/0452 |
| 2020/0137774 A1* | 4/2020 | Molisch | H04L 25/0228 |
| 2020/0177249 A1* | 6/2020 | Ramireddy | H04B 7/0673 |
| 2020/0200849 A1* | 6/2020 | Grodzki | G01R 33/565 |
| 2020/0204220 A1* | 6/2020 | Zirwas | H04B 7/0417 |
| 2020/0235799 A1* | 7/2020 | Wang | H04B 7/0626 |
| 2020/0244320 A1* | 7/2020 | Wang | H04B 7/0456 |
| 2020/0259692 A1* | 8/2020 | Hadani | H04L 27/32 |
| 2020/0259697 A1* | 8/2020 | Delfeld | H04B 7/0452 |
| 2020/0287672 A1* | 9/2020 | Namboodiri | H04L 27/2623 |
| 2020/0373984 A1* | 11/2020 | Akoum | H04B 17/382 |
| 2020/0374014 A1* | 11/2020 | Bendlin | H04B 17/104 |
| 2020/0374068 A1* | 11/2020 | Wang | H04L 27/2639 |
| 2020/0389268 A1* | 12/2020 | Sathyanarayan | H04L 27/0008 |
| 2020/0412500 A1* | 12/2020 | Wang | H04L 5/0007 |
| 2021/0083742 A1* | 3/2021 | Akoum | H04B 7/0626 |
| 2021/0099210 A1* | 4/2021 | Ramireddy | H04B 7/0434 |
| 2021/0135905 A1* | 5/2021 | Kons | H04L 25/0248 |
| 2021/0143885 A1* | 5/2021 | Großman | H04B 7/0626 |
| 2021/0167825 A1* | 6/2021 | Ramireddy | H04B 7/0417 |
| 2021/0167879 A1* | 6/2021 | Vela | H04B 17/3912 |
| 2021/0194602 A1* | 6/2021 | Bendlin | H04B 17/102 |
| 2021/0351880 A1* | 11/2021 | Hadani | H04L 1/0023 |
| 2022/0038155 A1* | 2/2022 | Akoum | H04L 25/0222 |
| 2022/0060263 A1* | 2/2022 | Bendlin | H04B 17/102 |
| 2022/0173855 A1* | 6/2022 | Akoum | H04L 25/0222 |

OTHER PUBLICATIONS

Final Office Action received for U.S. Appl. No. 16/419,809 dated Nov. 12, 2020, 29 pages.
Non-Final Office Action received for U.S. Appl. No. 16/419,809 dated Jun. 12, 2020, 14 pages.
Non-Final Office Action received for U.S. Appl. No. 16/419,432 dated May 14, 2020, 13 pages.
International Search Report and Written Opinion received for PCT Application Serial No. PCT/US2020/030805 dated Aug. 11, 2020, 12 pages.
Notice of Allowance received for U.S. Appl. No. 16/419,432 dated Sep. 23, 2020, 35 pages.
Non-Final Office Action received for U.S. Appl. No. 16/419,561 dated Sep. 17, 2020, 20 pages.
Notice of Allowance received for U.S. Appl. No. 16/455,123 dated Jan. 27, 2021, 50 pages.
Notice of Allowance received for U.S. Appl. No. 16/419,561 dated Dec. 10, 2020, 35 pages.
Non-Final Office Action received for U.S. Appl. No. 16/419,809 dated Jul. 22, 2021, 22 pages.
Notice of Allowance received for U.S. Appl. No. 17/195,747 dated Aug. 9, 2021, 52 pages.
Notice of Allowance received for U.S. Appl. No. 17/104,834 dated Jul. 16, 2021, 65 pages.
Non-Final Office Action received for U.S. Appl. No. 16/419,809 dated Dec. 9, 2021, 21 pages.
Notice of Allowance received for U.S. Appl. No. 17/453,982 dated Jun. 23, 2022, 96 pages.
Liu et al., "Pulse-Doppler Signal Processing with Quadrature Compressive Sampling", IEEE Transactions on Aerospace and Electronic Systems, vol. 51, No. 2, 2015, pp. 1216-1230.
Bar-Ilan et al., "Sub-Nyquist Radar via Doppler Focusing", IEEE Transactions on Signal Processing, vol. 62, No. 7, 2014, pp. 1796-1811.
Final Office Action received for U.S. Appl. No. 16/419,809 dated Aug. 25, 2022, 18 pages.
Non Final Office Action received for U.S. Appl. No. 17/244,996 dated Aug. 4, 2022, 44 pages.
Non-Final Office Action received for U.S. Appl. No. 16/419,809 dated May 12, 2022, 34 pages.
Examination Report received for Indian Patent Application Serial No. 202147054104 dated Mar. 29, 2022, 7 pages.

* cited by examiner

FACILITATING SPARSITY ADAPTIVE FEEDBACK IN THE DELAY DOPPLER DOMAIN IN ADVANCED NETWORKS

RELATED APPLICATIONS

The subject patent application is a continuation of, and claims priority to each of, U.S. patent application Ser. No. 17/104,834, filed Nov. 25, 2020, and entitled "FACILITATING SPARSITY ADAPTIVE FEEDBACK IN THE DELAY DOPPLER DOMAIN IN ADVANCED NETWORKS," which is a continuation of U.S. patent application Ser. No. 16/419,432 (now U.S. Pat. No. 10,886,991), filed May 22, 2019, and entitled "FACILITATING SPARSITY ADAPTIVE FEEDBACK IN THE DELAY DOPPLER DOMAIN IN ADVANCED NETWORKS," the entireties of which applications are hereby expressly incorporated by reference herein.

TECHNICAL FIELD

This disclosure relates generally to the field of mobile communications and, more specifically, to feedback overhead in massive multiple input multiple output communications systems in advanced networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
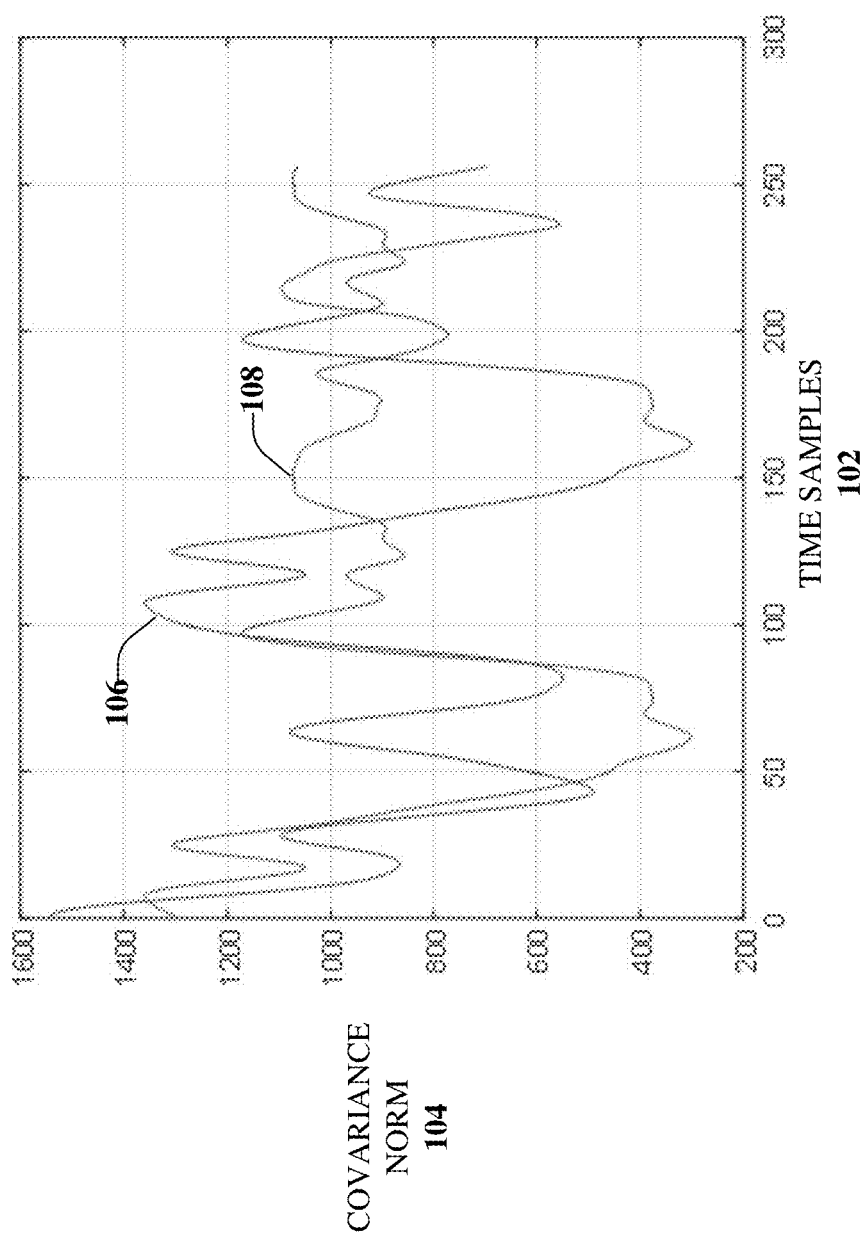
FIG. 1 illustrates an example, non-limiting, plot of covariance for a time domain.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Massive Multiple Input Multiple Output (MIMO) is a core technology to meet the improvements in spectral efficiency envisioned for Fifth Generation (5G) networks and other advanced networks. Massive MIMO systems boast of a large number of antennas at the base stations, serving tens of active users. Accurate channel state information (CSI) can be critical for the operation of massive MIMO systems. In time division duplexing (TDD) systems, where the downlink and uplink are operated in the same spectrum, CSI can be obtained by invoking channel reciprocity. For frequency division duplexing (FDD) systems, where the downlink and uplink occur at different parts of the frequency spectrum, CSI is generally obtained through limited feedback from a receiver device to a transmitter device. Obtaining CSI over the air is costly because of the dimensions of the involved channels in massive MIMO systems. The feedback overhead generally scales with the number of antennas. This subsequently affects the scalability of the reference signal design and hinders the practicality of massive MIMO.

In cellular networks, such as 5G New Radio (NR) and other advanced networks, the MIMO framework can be designed to operate on all frequency bands, both FDD and TDD. Further, given that FDD bands are still prevalent for operators in general (sub-6 GHz bands), reducing the overhead in massive MIMO FDD systems can be beneficial to the success of massive MIMO in practical communication networks deployments. The dimensionality problem is clear in the design of the feedback scheme in the first generation of NR.

Obtaining accurate channel state information is beneficial for the operation of massive MIMO systems. For FDD systems, relying on feedback from the user device to the base station device can result in a large overhead in the reference signals and the feedback overhead. For full-dimensional (FD-MIMO) systems, a CSI reporting procedure can be based on beamformed reference signals to improve the feedback framework for systems with a larger number of antennas. In 5G NR, in addition to beamformed CSI-RS, type II CSI can improve the accuracy of the feedback, especially for multi-user MIMO.

However, the procedures discussed above do not mitigate and/or reduce the feedback overhead, which can be provided with the disclosed aspects. As such, the disclosed aspects can enable a more practical massive MIMO implementation for FDD bands. Further the disclosed aspects can exploit the invariance and sparsity of the channel for pilot and feedback overhead reduction and/or mitigation for massive MIMO systems.

According to an embodiment, provided is a method that can comprise determining, by a first device comprising a processor, a channel covariance matrix in a time-frequency domain based on a channel estimation associated with reference signals received from a second device. The method also can comprise decomposing, by the first device, the channel covariance matrix into a group of component matrices. Further, the method can comprise transforming, by the first device, respective matrices of the group of component matrices into respective covariance matrices in a delay doppler domain. The method also can comprise determining, by the first device, channel state information feedback in the delay doppler domain.

According to some implementations, transforming the respective matrices can comprise applying respective symplectic fourier transforms to matrices in the group of component matrices. Further to these implementations, the respective symplectic fourier transforms can relate a delay Doppler matrix to a reciprocal time frequency.

In some implementations, decomposing the channel covariance matrix into component matrices can comprise decomposing the channel covariance matrix based on a structure of an antenna grid at the second device. According to some implementations, decomposing the channel covariance matrix into component matrices can comprise decomposing the channel covariance matrix in a vertical domain, a horizontal domain, and an uncorrelated domain.

The method can comprise, according to some implementations, selecting, by the first device, points from a group of points on a delay doppler grid, wherein a point corresponds to a covariance matrix. Further, the method can comprise selecting, by the first device, a precoding matrix index from a group of defined matrices based on the points. The method also can comprise indicating, by the first device, the precoding matrix index to the second device based on a feedback code-book based procedure. In an example, selecting the points can comprise choosing values of a chosen norm of the respective covariance matrices in the delay doppler domain.

According to some implementations, the method can comprise determining, by the first device, a codebook according to a location of a covariance matrix and an associated value of a norm function in in a delay doppler grid.

In some implementations, the method can comprise assigning, by the first device, a first feedback budget level to first samples in a delay doppler grid determined to have first norm levels above a defined norm threshold and a second feedback budget level to second samples in the delay doppler grid determined to have second norm levels below the defined norm threshold. Further to these implementations, the method can comprise conveying, by the first device, the first samples to the second device prior to the second samples as a function of the first feedback budget level and the second feedback budget level.

The method can comprise, according to some implementations, sorting, by the first device, samples in a delay doppler grid according to respective values of norm functions of the samples. Further, the method can comprise assigning, by the first device, feedback bits to the samples based on the respective norm values. In addition, the method can comprise conveying, by the first device, a first group of samples selected from the samples based on the feedback bits.

Another embodiment relates to a system that can comprise a processor and a memory that stores executable instructions that, when executed by the processor, facilitate performance of operations. The operations can comprise receiving reference signals from a second device and determining a channel covariance matrix in a time-frequency domain based on a channel estimation associated with the reference signals. Further, the operations can comprise decomposing the channel covariance matrix into a group of component matrices. The operations also can comprise transforming respective matrices of the group of component matrices into respective covariance matrices in a delay doppler domain. The operations also can comprise determining channel state information feedback in a delay doppler domain.

In an example, transforming the respective matrices can comprise applying respective symplectic fourier transforms to matrices in the group of component matrices. Further to this example, the respective symplectic fourier transforms can convert reciprocal time frequency into a delay doppler matrix.

According to some implementations, the operations can comprise decomposing the channel covariance matrix based on a structure of an antenna grid at the second device. In some implementations, the operations can comprise decomposing the channel covariance matrix in a vertical domain, a horizontal domain, and an uncorrelated domain.

The operations can comprise, according to some implementations, selecting points from a group of points on a delay doppler grid, wherein a point corresponds to a covariance matrix. Further, the operations can comprise selecting a precoding matrix index from a group of defined matrices based on the points. The operations also can comprise indicating the precoding matrix index to the second device based on a feedback code-book based procedure. Further to these implementations, selecting the points comprises choosing values of a chosen norm of the respective covariance matrices in the delay doppler domain.

Another embodiment can relate to a machine-readable storage medium, comprising executable instructions that, when executed by a processor, facilitate performance of operations. The operations can comprise performing a channel estimation based on reference signals received from a network device. The operations also can comprise determining covariance matrices in a time-frequency domain based on the channel estimation. Further, the operations can comprise decomposing the covariance matrices into a first covariance matrix, a second covariance matrix, and a third covariance matrix. The operations also can comprise obtaining a group of covariance matrices in a delay doppler domain based on application of respective transforms to the first covariance matrix, the second covariance matrix, and the third covariance matrix.

According to some implementations, the operations can comprise performing grid subsampling based on the group of covariance matrices in the delay doppler domain. Further, the operations can comprise facilitating a transmission to the network device, wherein the transmission comprises quantized feedback based on the performing the grid subsampling.

In some implementations, decomposing the covariance matrices into the first covariance matrix, the second covariance matrix, and the third covariance matrix can comprise decomposing the covariance matrices into a vertical domain, a horizontal domain, and an uncorrelated domain.

Accordingly, discussed herein is a feedback compression scheme that exploits the invariance and sparsity of the channel in the delay Doppler domain, such that the limited feedback can be performed based on the delay doppler transformation of the covariance matrix of the channel, and subsampling the delay-doppler grid to decrease the feedback overhead.

Referring initially to FIG. 1, illustrated is an example, non-limiting, plot 100 of covariance for a time domain. Time samples 102 are illustrated along the horizontal axis; covariance norm 104 is illustrated along the vertical axis. A first time sample is illustrated by the first line 106 and a second time sample is illustrated by the second line 108. The covariance norm 104 is shown by averaging over the frequency samples as a function of time samples 102.

Figure 2:
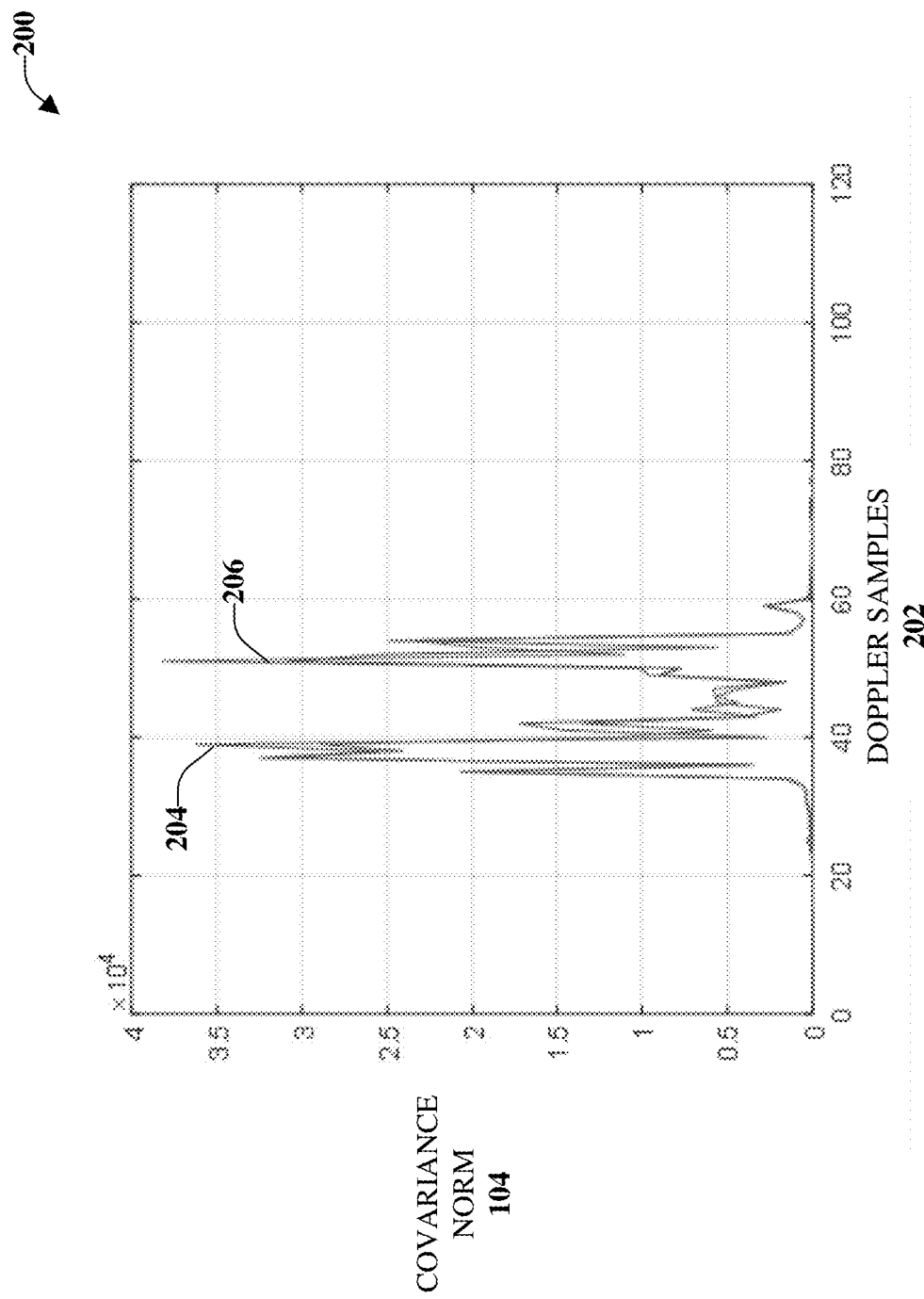
FIG. 2 illustrates an example, non-limiting, plot of covariance for a Doppler domain in accordance with one or more embodiments described herein.

By comparison, FIG. 2 illustrates an example, non-limiting, plot 200 of covariance for a Doppler domain in accordance with one or more embodiments described herein. Repetitive description of like elements employed in other embodiments described herein is omitted for sake of brevity. Doppler samples 202 are illustrated along the horizontal axis. A first time sample is illustrated by the first line 204 and a second time sample is illustrated by the second line 206. The covariance norm of the same channel in the delay doppler domain is shown by averaging over the delay samples, as a function of the Doppler samples 202.

As can be determined based on a comparison between FIG. 1 and FIG. 2, for two channel instances at two different times, the channel in time frequency domain is variant (e.g., the first line 106 and the second line 108). In contrast, the channel in the delay doppler domain is invariant to time window change (e.g., the first line 204 and the second line 206). Leveraging this invariance can be utilized for compressing the feedback in FDD systems.

Figure 3:
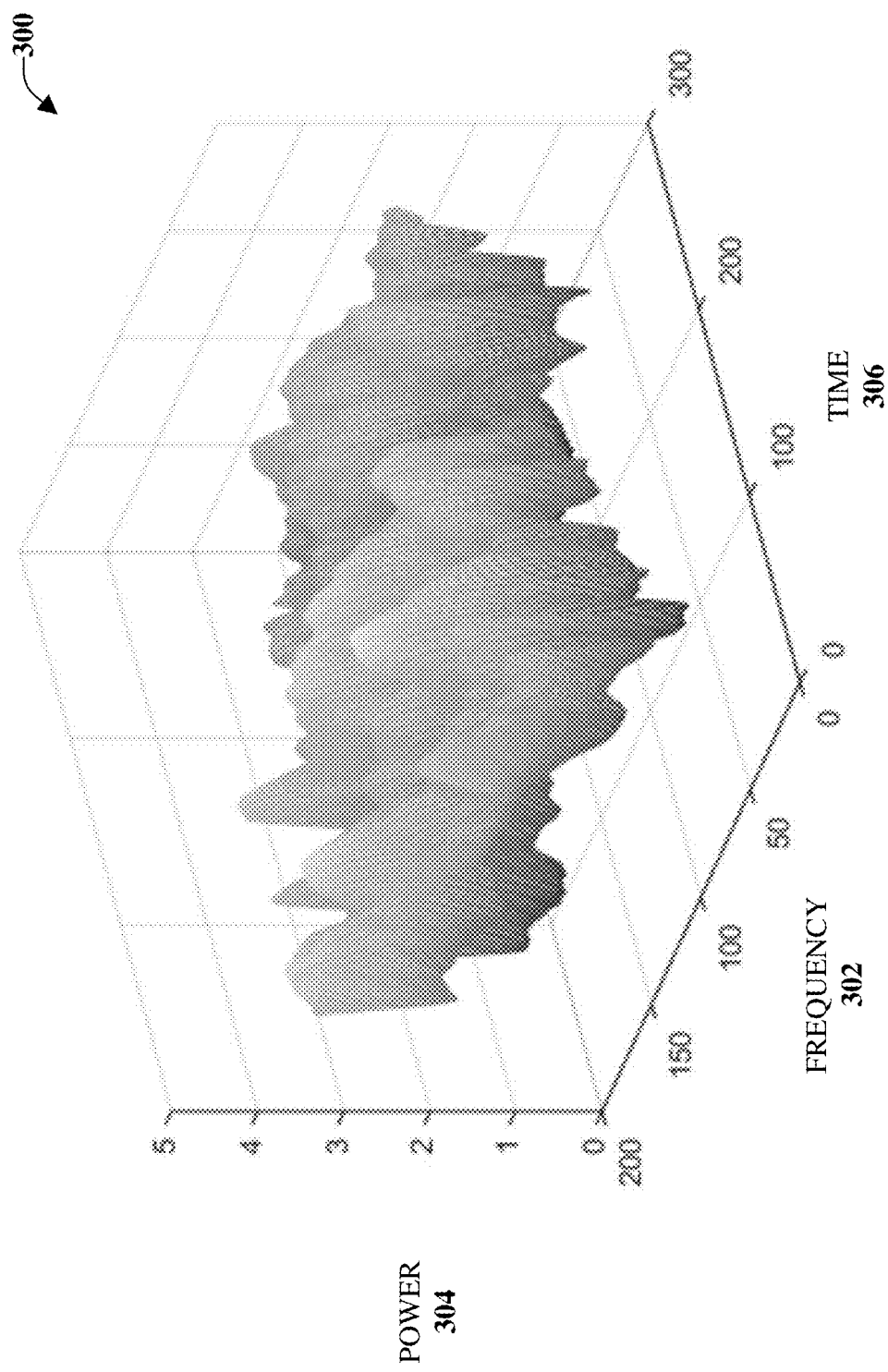
FIG. 3 illustrates a chart of the power of a channel in the time frequency domain.
Figure 4:
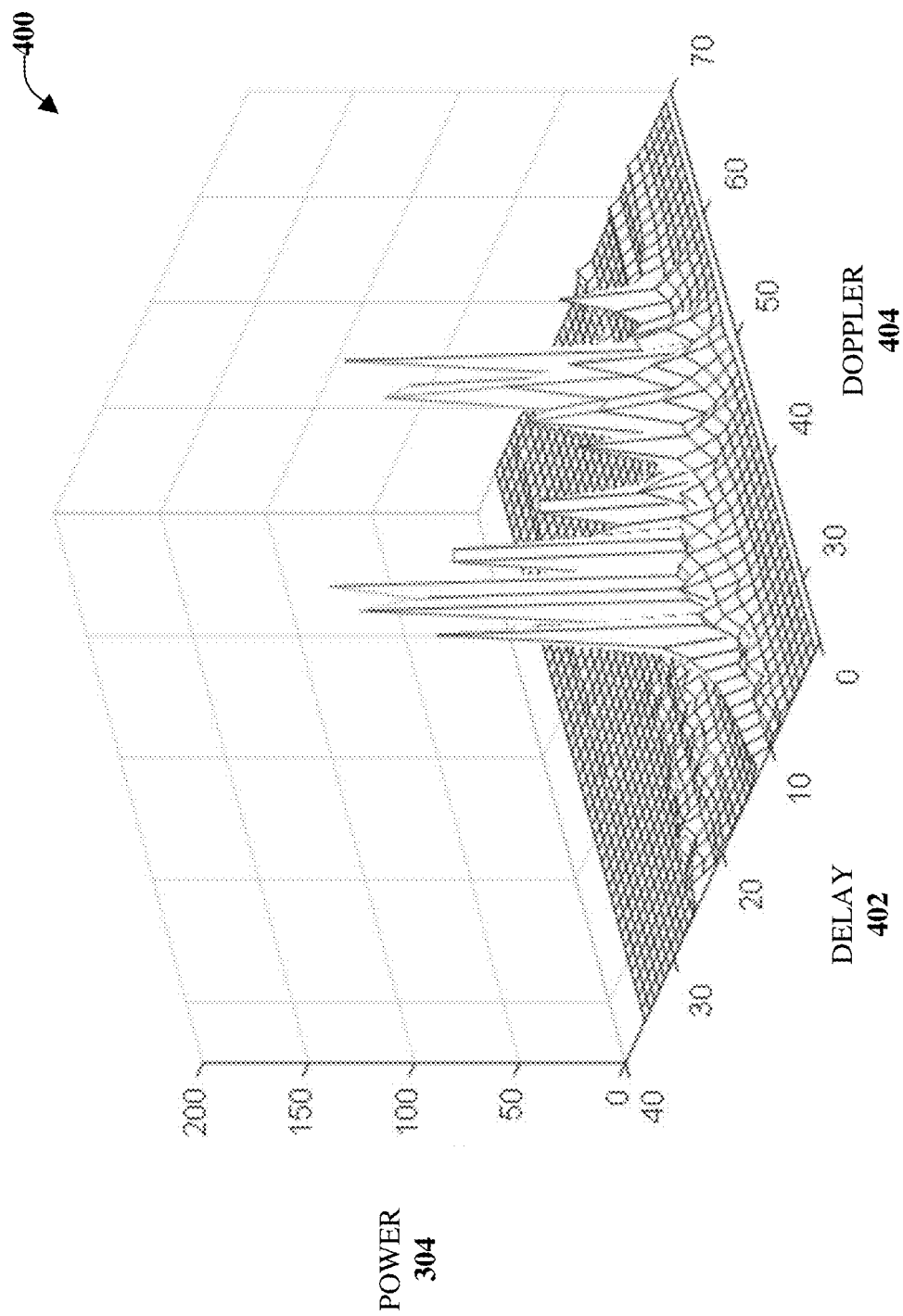
FIG. 4 illustrates a chart of the power of the same channel of FIG. 3 in the delay doppler domain in accordance with one or more embodiments described herein.

An example of the sparsity of the channel in the delay doppler domain is given in FIG. 3 and FIG. 4. FIG. 3 illustrates a chart 300 of the power of a channel in the time frequency domain. Frequency 302 is illustrated along the X-axis; power 304 is illustrated along the Y-axis; and time 306 is illustrated along the Z-axis.

Further, FIG. 4 illustrates a chart 400 of the power of the same channel of FIG. 3 in the delay doppler domain in accordance with one or more embodiments described herein. Repetitive description of like elements employed in other embodiments described herein is omitted for sake of brevity. In this case, delay 402 is illustrated along the X-axis and Doppler 404 is illustrated along the Z-axis. As illustrated, some values or points can be high and other points can be low (e.g., at or near zero). Using the sparsity of the channel in the delay doppler domain can be utilized, as discussed herein, to compress the feedback in FDD MIMO systems.

Figure 5:
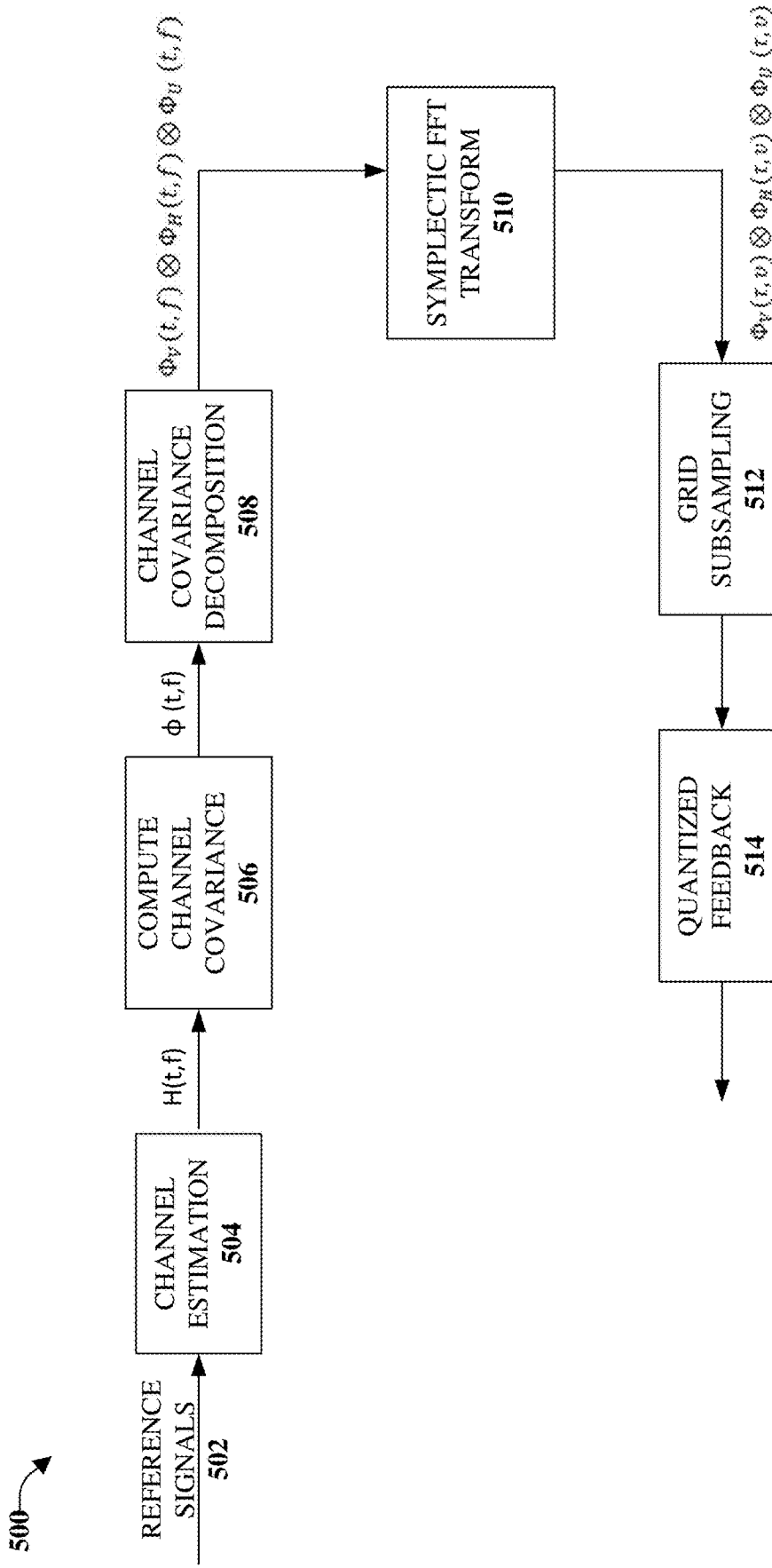
FIG. 5 illustrates an example, non-limiting, block diagram of channel estimation and feedback compression in accordance with one or more embodiments described herein.

FIG. 5 illustrates an example, non-limiting, block diagram 500 of channel estimation and feedback compression in accordance with one or more embodiments described herein. As illustrated, input signals, such as reference signals 502 can be received and channel estimation 504 can be performed. After the channel estimation 504, a covariance matrix 506 in the time frequency domain can be computed, and then decomposed into component matrices 508. In an example, this can be performed by following the structure of the antenna grid at the transmitter. In one example, this decomposition can be in the vertical, horizontal, and uncorrelated domains, respectively.

A Symplectic Fourier Transform (SFFT) can then be applied to each component covariance matrix, as indicated at 510. Applying the SFFT can obtain the covariance matrix in the delay doppler domain. The SFFT relates a N×M delay Doppler matrix x(nΔτ, mΔv) to a reciprocal M×N time frequency X(m'Δt, n'Δf) as follows:

$$X(m'\Delta t, n'\Delta f) = \sum_{n=0}^{N-1} \sum_{m=0}^{M-1} \exp\left(j2\pi\left(\frac{m'm}{M} - \frac{n'n}{N}\right)\right) x(n\Delta\tau, m\Delta v)$$

The SFFT transform can be equivalent to an application of N-dimensional FFT along the columns of x(nΔτ, mΔv), followed by an inverse M-dimensional FFT transform along its rows.

According to an embodiment, after obtaining the covariance matrix in the delay-doppler domain, at 512, a dual stage framework can be implemented. In the dual stage framework, L points can be selected on the delay doppler grid out of the N×M possible points. For each of these selected L points, where every point corresponds to a covariance matrix, a limited feedback codebook-based scheme can be utilized to indicate the precoding matrix index (PMI) to the transmitter device (e.g., the base station device). Note that the preferred precoder might not be explicitly indicated to the network, but its index (PMI) can be chosen from a set of predefined matrices forming a codebook fed back to the network (e.g., the transmitter device), at 514, where the same codebook of these predefined matrices is available at both the receiver device (e.g., the UE device) and the transmitter device (e.g., the network).

The selection of L points out of N×M points can be performed according to the power spectrum of the covariance matrices in the delay doppler domain. Given the sparsity of the covariance matrix representation in the delay doppler domain, L out of N×M selected points whose power is above a certain threshold can be selected for feedback. The L selected points and their relative position in the delay doppler grid can be fed back such that at the base station (e.g., the transmitter device), the delay doppler grid can be reconstructed from the set of observed L points, given the sparsity of the grid. The L samples are picked such that the grid can be reconstructed at the transmitter (e.g., the network device). An example of the reconstruction framework can be based on compressed sampling. Compressed sampling considers the sparse reconstruction problem of estimating an unknown sparse vector x from an observed vector of measurements y. The reconstruction can be subject to the constraint that x is S sparse (e.g., at most S of its entries are non-zero). The positions (indices) on the non zero entries of x are unknown.

In another embodiment, the subsampling of the grid in the delay doppler domain can be performed such that to ensure backward compatibility, given that existing orthogonal frequency division multiple access (OFDMA) systems, such as the 3GPP 5G NR system, have predefined subcarrier spacings and symbol durations. The delay doppler grid can be subsampled to control the overhead of the CSI feedback. The subsampling can be regular or irregular. In case of regular subsampling, values for each point of the grid can be reported including those with zero energy. Zero energy here means that the energy is below a predefined or configurable threshold. Alternatively, in case of irregular subsampling, only non-zero values are reported, in which case only the values above a certain threshold are reported.

In another embodiment, the feedback compression can be performed jointly, such that the codebook that the PMI is based on, is chosen according to the location of the covariance matrix and its amplitude value (e.g. power) in the delay doppler grid. Samples in the delay doppler grid whose power are above a certain threshold, can be given a higher feedback budget (correspondingly a larger codebook which the PMI is based on). Other samples below a certain threshold can be given a lower feedback budget.

In another embodiment, the total feedback budget is a predetermined value. The samples in delay doppler grid are sorted according to the amplitude value. The feedback bits of each sample can be determined by the size of codebook for PMI. Only the top N samples are fed back such that the total number of feedback bits are within the budget. The remainder of the samples are not fed back (not included in the feedback budget)

In another embodiment, the total number of samples in feedback is a predetermined value. Then the samples in delay doppler grid are sorted according to the amplitude value and only the first N values are included in the feedback.

As discussed herein, the disclosed aspects can exploit the invariance and sparsity of the channel in the delay doppler domain. Further, the disclosed aspects can allow a receiver device (e.g., a UE device) to have a high flexibility in choosing the CSI feedback and reducing the CSI overhead. In addition, the disclosed aspects can make closed loop MIMO more realistic in high velocity UE devices (>300 km/h) because of the invariance of the channel in the delay doppler domain, and the ability to feed back CSI less frequently. Additionally, the disclosed aspects can make massive MIMO deployment in FDD frequencies more feasible.

For example, in massive MIMO, the number of antennas is increased and the feedback overhead and pilot, such as reference signal design overhead can also increase due to the need to feedback information about more channels between the base station and the UE device. In accordance with the disclosed aspects, the overhead can be reduced and, at substantially the same time, the performance can be improved.

As discussed, a time-frequency grid is converted to a new grid, referred to as a delay doppler grid. In the delay doppler grid, the channel is more invariance and much sparser as compared to the channel in the time-frequency grid, as discussed with respect to FIGS. 1-4 above.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
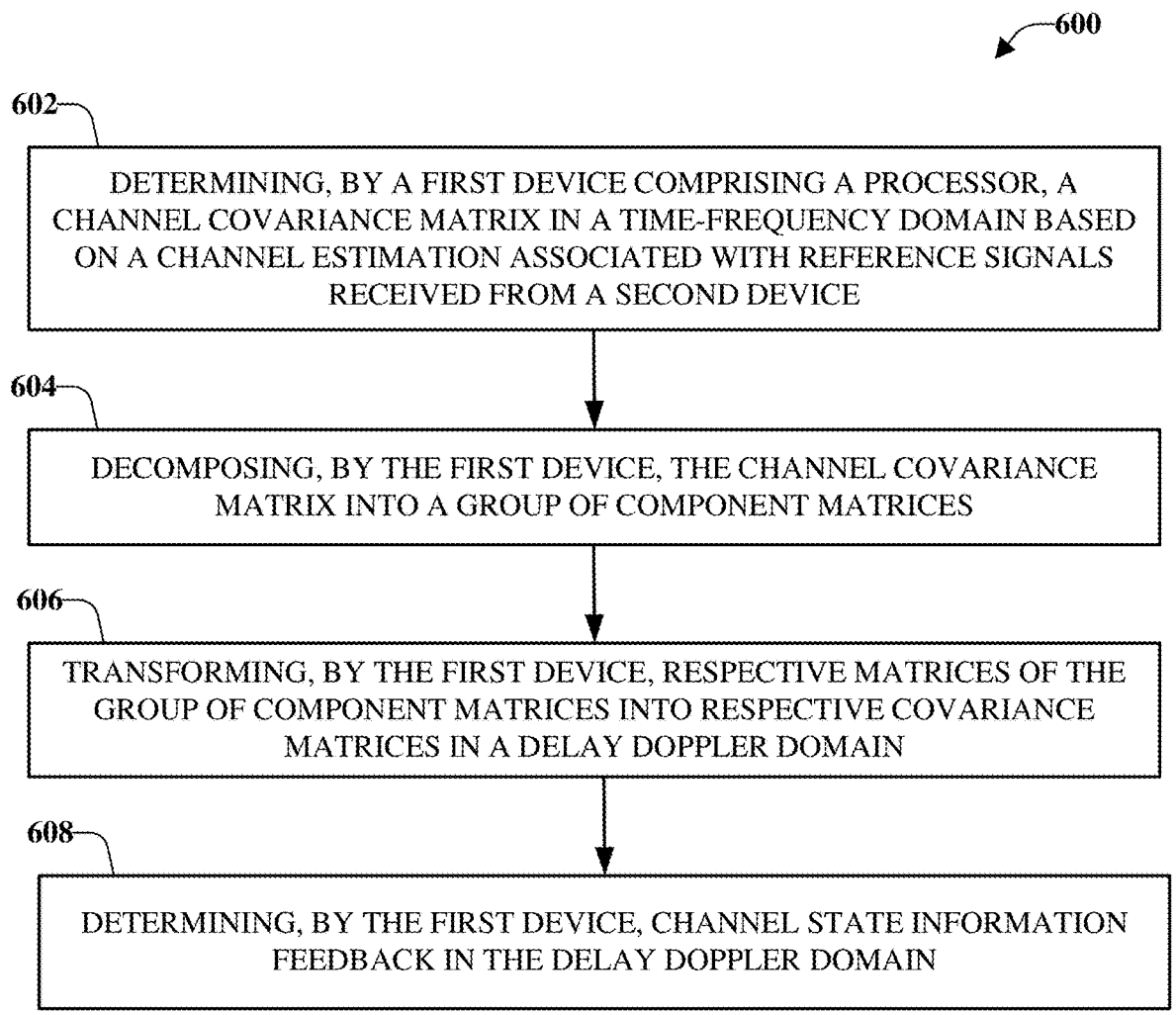
FIG. 6 illustrates a flow diagram of an example, non-limiting, computer-implemented method for facilitating sparsity adaptive feedback in the delay doppler domain in advanced networks in accordance with one or more embodiments described herein.

FIG. 6 illustrates a flow diagram of an example, non-limiting, computer-implemented method 600 for facilitating sparsity adaptive feedback in the delay doppler domain in advanced networks in accordance with one or more embodiments described herein.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a first device can determine a channel covariance matrix in a time-frequency domain based on a channel estimation associated with reference signals received from a second device. For example, the first device can be a UE device and the second device can be a base station device.

The channel covariance matrix can be decomposed into a group of component matrices, at 604 of the computer-implemented method 600. For example, decomposing the channel covariance matrix into component matrices can comprise decomposing the channel covariance matrix in a vertical domain, a horizontal domain, and an uncorrelated domain.

Further, at 606 of the computer-implemented method 600, the first device can transform respective matrices of the group of component matrices into respective covariance matrices in a delay doppler domain. In an example, transforming the respective matrices can comprise applying respective symplectic fourier transforms to matrices in the group of component matrices. The respective symplectic fourier transforms can relate a delay Doppler matrix to a reciprocal time frequency. Accordingly, at 608, the first device can determine channel state information feedback in the delay doppler domain.

Figure 7:
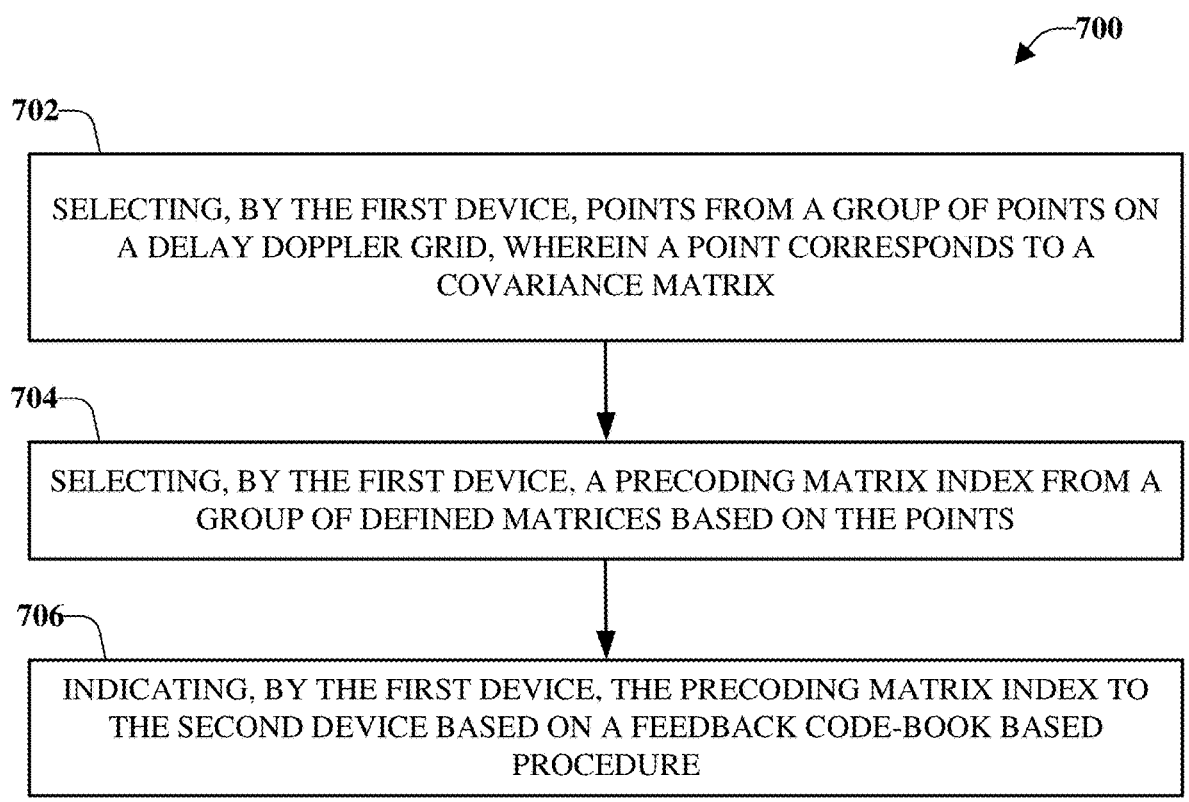
FIG. 7 illustrates a flow diagram of an example, non-limiting, computer-implemented method for selecting a codebook based on a sparsity adaptive feedback in the delay doppler domain in advanced networks in accordance with one or more embodiments described herein.

FIG. 7 illustrates a flow diagram of an example, non-limiting, computer-implemented method 700 for selecting a codebook based on a sparsity adaptive feedback in the delay doppler domain in advanced networks in accordance with one or more embodiments described herein.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

Upon or after converting matrices of a group of component matrices (of a time-frequency domain) into respective covariance matrices in a delay doppler domain, as discussed with respect to FIG. 6, at 702 of the computer-implemented method 700, a first device can select points from a group of points on a delay doppler grid. A point can correspond to a covariance matrix. For example, selecting the points can comprise choosing values of a chosen norm of the respective covariance matrices in the delay doppler domain. The values chosen can be the values determined to be the best values of the chosen norm, according to some implementations.

A precoding matrix index can be selected by the first device, at 704. For example, the precoding matrix index can be selected from a group of defined matrices based on the points. Further, at 706 of the computer-implemented method 700, the first device can indicate the precoding matrix index to the second device based on a feedback code-book based procedure.

Figure 8:
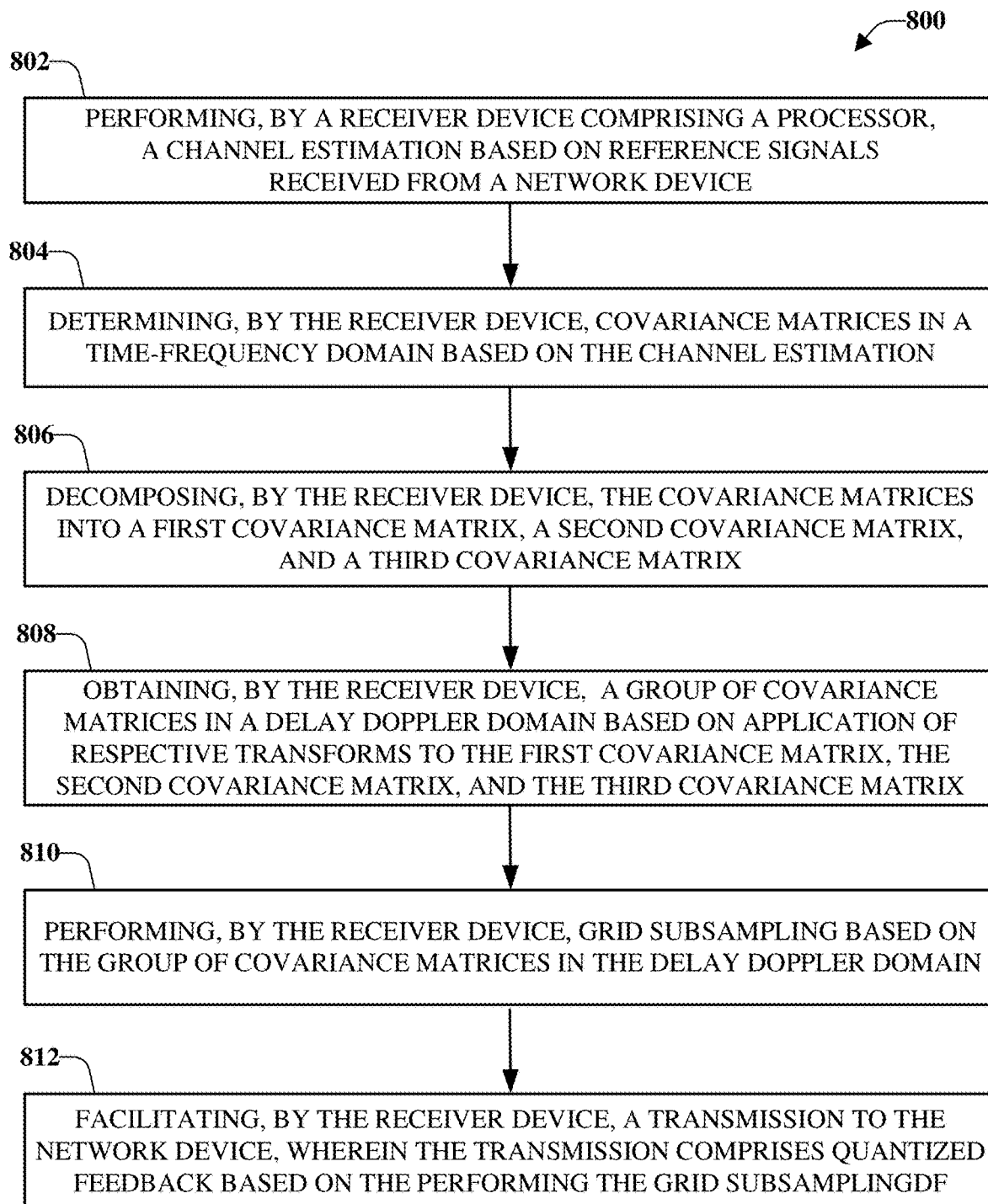
FIG. 8 illustrates a flow diagram of an example, non-limiting, computer-implemented method for selecting a codebook based on a sparsity adaptive feedback in the delay doppler domain in advanced networks in accordance with one or more embodiments described herein.

FIG. 8 illustrates a flow diagram of an example, non-limiting, computer-implemented method 800 for selecting a codebook based on a sparsity adaptive feedback in the delay doppler domain in advanced networks in accordance with one or more embodiments described herein.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, a receiver device comprising a processor can perform a channel estimation based on reference signals received from a network device.

Further, at 804, the receiver device can determine covariance matrices in a time-frequency domain based on the channel estimation. The covariance matrices can be decomposed, by the receiver device, into a first covariance matrix, a second covariance matrix, and a third covariance matrix, at 806. For example, decomposing the covariance matrices into the first covariance matrix, the second covariance matrix, and the third covariance matrix can comprise decomposing the covariance matrices into a vertical domain, a horizontal domain, and an uncorrelated domain.

A group of covariance matrices in a delay doppler domain can be obtained at 808 of the computer-implemented method 800. For example, obtaining a group of covariance matrices can be based on application of respective transforms to the first covariance matrix, the second covariance matrix, and the third covariance matrix.

Further, at 810, a grid subsampling can be performed based on the group of covariance matrices in the delay doppler domain. A transmission to a transmitter device (e.g., a network device) can be facilitated by the receiver device at 812. The transmission can comprise quantized feedback based on the performing the grid subsampling.

In an example, facilitating the transmission can comprise determining a codebook according to a location of a covariance matrix and an associated value of a norm function in a delay doppler grid.

In another example, a first feedback budget level can be assigned to first samples in a delay doppler grid determined to have first power levels above a defined power threshold and a second feedback budget level to second samples in the delay doppler grid determined to have second power levels below the defined power threshold. The first samples can be conveyed to the transmitter device (e.g., the network device) prior to the second samples as a function of the first feedback budget level and the second feedback budget level.

According to some implementations, samples in a delay doppler grid can be stored according to respective amplitude values of the samples. Further, feedback bits can be assigned to the samples based on the respective amplitude values. A first group of samples selected from the samples can be conveyed to the transmitter device based on the feedback bits.

Described herein are systems, methods, articles of manufacture, and other embodiments or implementations that can facilitate sparsity adaptive feedback in the delay doppler domain in advanced networks. Facilitating sparsity adaptive feedback in the delay doppler domain can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), a Remote Radio Head (RRH), nodes in Distributed Antenna System (DAS) etc.

The various aspects described herein can relate to New Radio (NR), which can be deployed as a standalone radio access technology or as a non-standalone radio access technology assisted by another radio access technology, such as Long Term Evolution (LTE), for example.

It should be noted that although various aspects and embodiments have been described herein in the context of 5G, 6G, Universal Mobile Telecommunications System (UMTS), and/or Long Term Evolution (LTE), or other next generation networks, the disclosed aspects are not limited to 5G, 6G, a UMTS implementation, and/or an LTE implementation as the disclosed aspects can also be applied in 3G, 4G, 5G, 6G, or LTE systems. For example, aspects or features of the disclosed embodiments can be exploited in substantially any wireless communication technology. Such wireless communication technologies can include, but are not limited to, UMTS, Code Division Multiple Access (CDMA), Wireless Fidelity (Wi-Fi), Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating facilitate sparsity adaptive feedback in the delay doppler domain in advanced networks are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In addition, advanced networks, such as a 6G network can be configured to provide more bandwidth than the bandwidth available in other networks (e.g., 4G network, 5G network). A 6G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 6G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
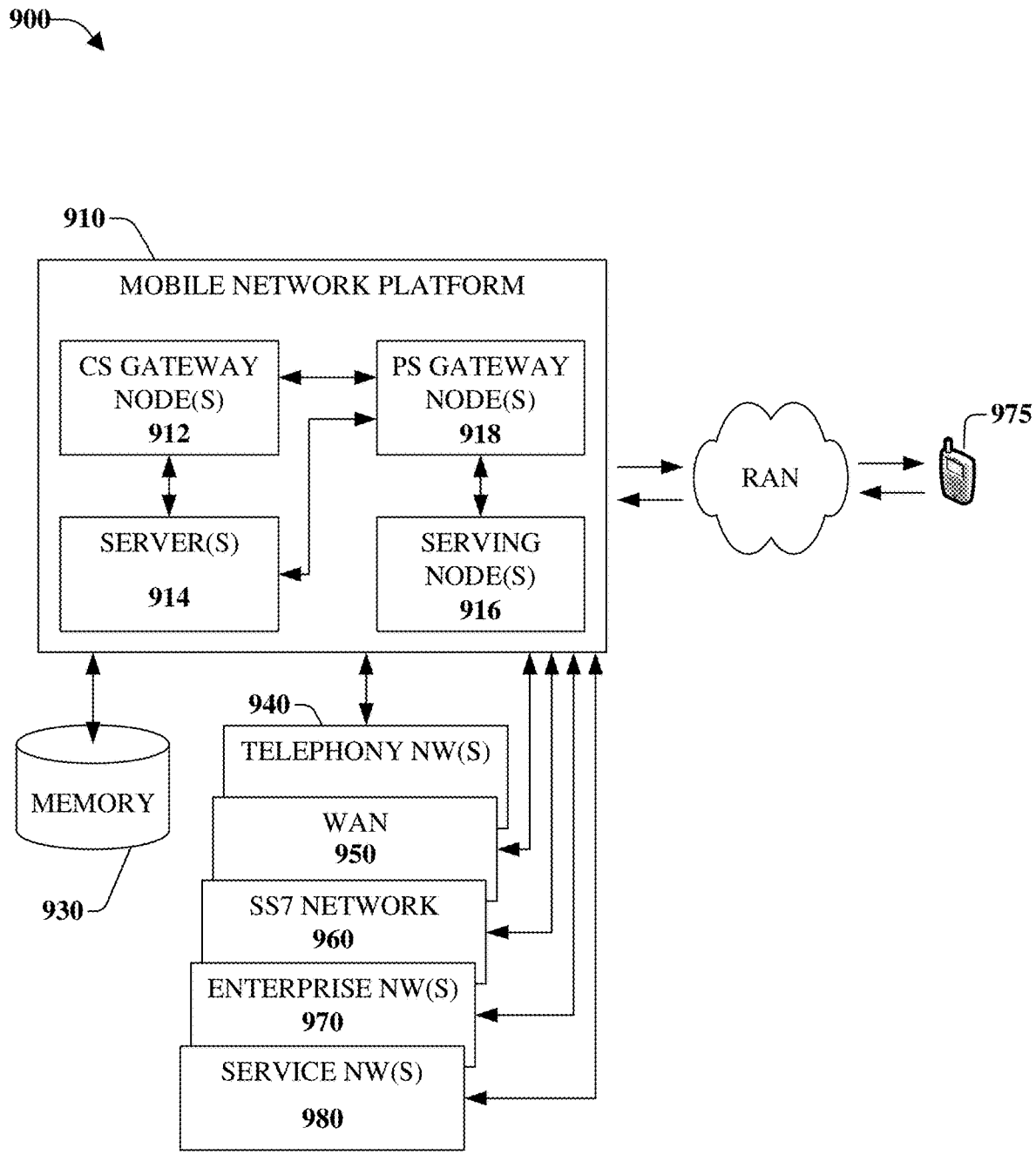
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
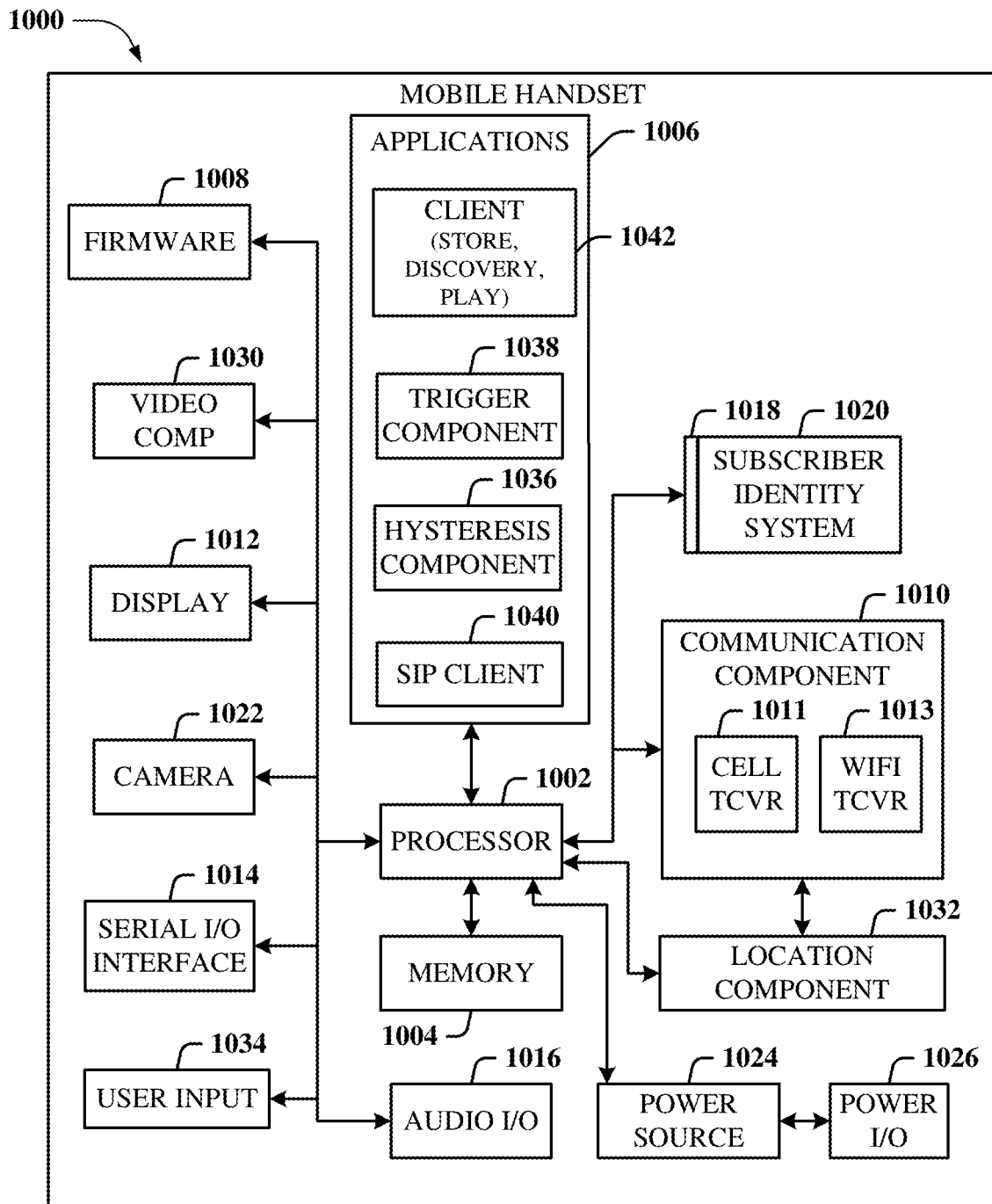
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
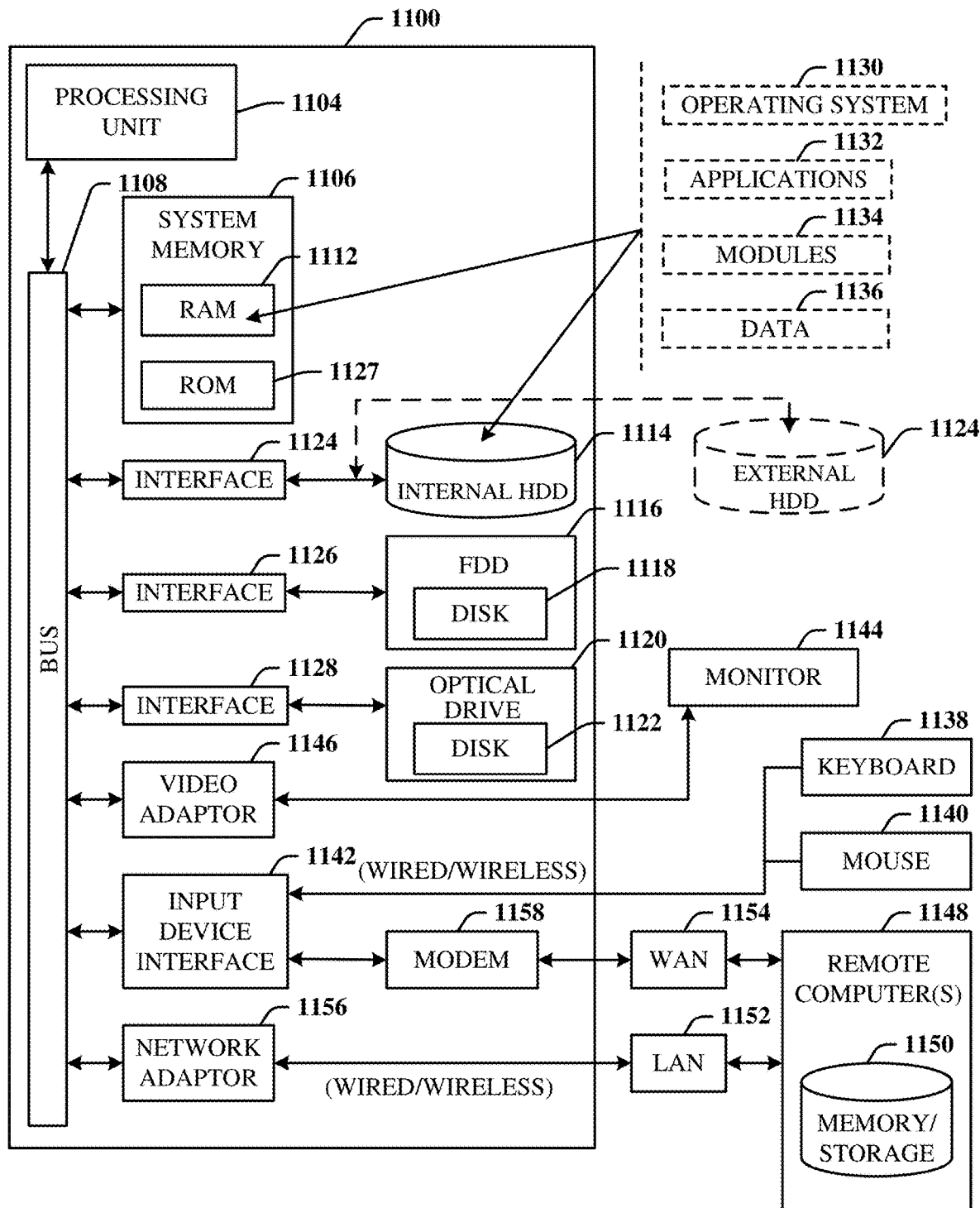
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random-access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touchscreen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at a 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Systems, methods and/or machine-readable storage media for a group hybrid automatic repeat request procedure for sidelink group-case in advanced networks are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    selecting, by a first device comprising a processor, points from a group of points on a delay doppler grid, wherein a point of the points corresponds to a covariance matrix;
    determining, by the first device, a precoding matrix index from a group of defined matrices based on the points; and
    indicating, by the first device, the precoding matrix index to a second device based on a procedure that shares a codebook between the first device and the second device.

2. The method of claim 1, wherein the selecting comprises determining values of a defined norm of the respective covariance matrices in a delay doppler domain.

3. The method of claim 1, further comprising:
    prior to the selecting, converting, by the first device, matrices of a group of component matrices into respective covariance matrices in a delay doppler domain.

4. The method of claim 3, wherein the group of component matrices is a group of component matrices of a time-frequency domain.

5. The method of claim 3, further comprising:
    prior to the converting, transforming, by the first device, respective matrices of the group of component matrices into respective covariance matrices in the delay doppler domain; and
    determining, by the first device, channel state information feedback in the delay doppler domain.

6. The method of claim 5, further comprising:
prior to the determining of the channel state information feedback, decomposing, by the first device, a channel covariance matrix into respective covariance matrices in the delay doppler domain.

7. The method of claim 6, wherein the decomposing comprises decomposing the channel covariance matrix in a time-frequency domain.

8. The method of claim 6, wherein the decomposing comprises using a feedback compression protocol that is based on a first measure of an invariance of a channel in the delay doppler domain and a second measure of a sparsity of the channel in the delay doppler domain.

9. The method of claim 6, wherein the decomposing comprises decomposing the covariance matrices into a vertical domain, a horizontal domain, and an uncorrelated domain.

10. The method of claim 5, further comprising:
applying, by the first device, respective symplectic fourier transforms to the respective matrices, wherein the respective symplectic fourier transforms convert reciprocal time frequency into a delay doppler matrix.

11. A first device, comprising:
a processor; and
a memory that stores executable instructions that, when executed by the processor, facilitate performance of operations, comprising:
selecting a precoding matrix index from a group of defined matrices based on points of a group of points on a delay doppler grid, wherein a point of the group of points corresponds to a covariance matrix; and
transmitting to a second device an indication of the precoding matrix index from a codebook of precoding matrix indexes accessible to the first device and the second device.

12. The first device of claim 11, wherein the operations further comprise:
prior to the selecting, determining values of a defined norm of respective covariance matrices corresponding to the points in a delay doppler domain.

13. The first device of claim 12, wherein the operations further comprise:
prior to the determining, converting matrices of a group of component matrices into the respective covariance matrices in the delay doppler domain.

14. The first device of claim 13, wherein the group of component matrices comprises component matrices of a time-frequency domain.

15. The first device of claim 13, wherein the operations further comprise:
prior to the converting, transforming respective matrices of the group of component matrices into the respective covariance matrices in the delay doppler domain; and
determining channel state information feedback in the delay doppler domain.

16. The first device of claim 11, wherein the operations further comprise:
prior to the selecting, determining ones of the group of points that comprise a power level above a defined threshold, wherein the selecting comprises selecting the ones of the group of points that comprise the power level above the defined threshold.

17. A non-transitory machine-readable medium, comprising executable instructions that, when executed by a processor of a user equipment, facilitate performance of operations, comprising:
converting matrices of a group of component matrices into respective covariance matrices in a delay doppler domain;
selecting a precoding matrix index from a group of defined matrices based on points of a group of points on a delay doppler grid; and
transmitting, to network equipment, the precoding matrix index based on a feedback code-book based procedure.

18. The non-transitory machine-readable medium of claim 17, wherein the group of component matrices comprises component matrices of a time-frequency domain.

19. The non-transitory machine-readable medium of claim 17, wherein the operations further comprise:
prior to the converting, transforming respective matrices of the group of component matrices into the respective covariance matrices in the delay doppler domain; and
determining channel state information feedback in the delay doppler domain.

20. The non-transitory machine-readable medium of claim 17, wherein the operations further comprise:
prior to the selecting, determining points of the group of points that comprise a power level above a defined threshold, wherein the selecting comprises selecting the points of the group of points that comprise the power level above the defined threshold.

* * * * *